(12) United States Patent
Beecroft

(10) Patent No.: US 8,917,741 B2
(45) Date of Patent: Dec. 23, 2014

(54) METHOD OF DATA DELIVERY ACROSS A NETWORK

(75) Inventor: Jon Beecroft, Bristol (GB)

(73) Assignee: Cray UK Limited, Reading (GB)

(*) Notice: Subject to any disclaimer, the term of this patent is extended or adjusted under 35 U.S.C. 154(b) by 156 days.

(21) Appl. No.: 12/997,226

(22) PCT Filed: Jun. 9, 2009

(86) PCT No.: PCT/GB2009/001438
§ 371 (c)(1),
(2), (4) Date: Dec. 9, 2010

(87) PCT Pub. No.: WO2009/150412
PCT Pub. Date: Dec. 17, 2009

(65) Prior Publication Data
US 2011/0085567 A1 Apr. 14, 2011

(30) Foreign Application Priority Data
Jun. 9, 2008 (GB) .................................. 0810503.3

(51) Int. Cl.
*H04L 12/28* (2006.01)
*H04L 12/56* (2006.01)

(52) U.S. Cl.
USPC .......................................... 370/414; 370/418

(58) Field of Classification Search
CPC ...... H04L 49/90; H04L 47/10; H04L 12/5693
USPC ................................................. 370/412–418
See application file for complete search history.

(56) References Cited

U.S. PATENT DOCUMENTS

| 6,067,298 | A | * | 5/2000 | Shinohara | 370/395.71 |
| 6,680,933 | B1 | * | 1/2004 | Cheesman et al. | 370/352 |
| 2002/0044546 | A1 | * | 4/2002 | Magill et al. | 370/352 |
| 2005/0002334 | A1 | | 1/2005 | Chao et al. | |

(Continued)

FOREIGN PATENT DOCUMENTS

CN 101035076 A 9/2007

OTHER PUBLICATIONS

International Search Report, mailed Sep. 29, 2009, Authorized Officer: Athanasios Mariggis.

*Primary Examiner* — Ronald Abelson
(74) *Attorney, Agent, or Firm* — Craig J. Lervick; Larkin Hoffman Daly & Lindgren, Ltd.

(57) ABSTRACT

The present invention relates to a method of sorting data packets in a multi-path network having a plurality of ports; a plurality of network links; and a plurality of network elements, each network element having at least first and second separately addressable buffers in communication with a network link and the network links interconnecting the network elements and connecting the network elements to the ports, the method comprising: sorting data packets with respect to their egress port or ports such that at a network element a first set of data packets intended for the same egress port are queued in said first buffer and at least one other data packet intended for an egress port other than the egress port of the first set of data packets is queued separately in said second buffer whereby said at least one other data packet is separated from any congestion associated with the first set of data packets. The present invention further relates to a method of data delivery in a multi-path network comprising the sorting of data packets in accordance with a first aspect of the present invention. The present invention further relates to a multi-path network operable to sort data packets and operable to deliver data in a multi-path network.

42 Claims, 5 Drawing Sheets

(56) References Cited

U.S. PATENT DOCUMENTS

2007/0140159 A1* 6/2007 Eronen et al. ............ 370/328
2007/0206604 A1* 9/2007 Best et al. ............ 370/395.4
2007/0268903 A1* 11/2007 Nakagawa ............ 370/392
2009/0168767 A1* 7/2009 Anders et al. ............ 370/355

* cited by examiner

METHOD OF DATA DELIVERY ACROSS A NETWORK

BACKGROUND

1. Technical Field of the Invention

The present invention generally relates to a method of data delivery across a network and in particular to a method of minimising the effects of congestion in multi-path networks which use dynamic routing and to a multi-path network implementing the method. The method and multi-path network are suitable for use in, but not limited to, multi-processor networks such as storage networks, data centres and high performance computing. In particular, the present invention is suited for use in bridges, switches, routers, hubs and similar devices including Ethernet devices adapted for the distribution of standard IEEE 802 data frames or data frames meeting future Ethernet standards.

Protocol Layers

Conceptually, an Ethernet network is decomposed into a number of virtual layers in order to separate functionality. The most common and formally standardised model used is the Open Systems Interconnect (OSI) reference model. A useful article that describes in detail the OSI reference model is "OSI Reference Model—The ISO Model of Architecture for Open Systems Interconnection" by Hubert Zimmermann, IEEE Transactions on Communications, Vol. COM-28, No. 4, April 1980. The OSI reference model comprises seven layers of network system functionality, as follows:

1. Physical Layer is responsible for physical channel access. It consists of those elements involved in transmission and reception of signals, typically line drivers and receivers, signal encoders/decoders and clocks.
2. Data Link Layer provides services allowing direct communication between end-station devices over the underlying physical medium. This layer provides Framing, separating the device messages into discrete transmissions or frames for the physical layer, encapsulating the higher layer packet protocols. It provides Addressing to identify source and destination devices. It provides Error Detection to ensure that corrupted data is not propagated to higher layers.
3. Network Layer is responsible for network-wide communication, routing packets over the network between end-stations. It must accommodate multiple Data Link technologies and topologies using a variety of protocols, the most common being the Internet Protocol (IP).
4. Transport Layer is responsible for end-to-end communication, shielding the upper layers from issues caused during transmission, such as dropped data, errors and mis-ordering caused by the underlying medium. This layer provides the application with an error-free, sequenced, guaranteed delivery message service, managing the process to process data delivery between end stations. Transmission Control Protocol (TCP) and User Datagram Protocol (UDP) are the most commonly recognised Transport Layer protocols.
5. Session Layer is responsible for establishing communications sessions between applications, dealing with authentication and access control.
6. Presentation Layer ensures that different data representations used by machines are resolved.
7. Application Layer provides generic functions that allow user applications to communicate over the network.

For the purposes of this document we need not consider operations above the Transport Layer as the method described herein should, if well implemented, shield higher layers from issues arising in and below its scope.

Network Interconnections

A device that implements network services at the Data Link Layer and above is called a station. The Physical Layer is excluded from this definition as it is not addressable by a protocol. There are two types of station:

1. End Stations are the ultimate source and destination of network data communication across the network.
2. Intermediate Stations forward network data generated by end stations between source and destination.

An intermediate station which forwards completely at the Data Link Layer is commonly called a Bridge; a station which forwards at the Network Layer is commonly called a Router.

Network stations attached to an Ethernet network exchange data in short sequences of bytes called packets or Protocol Data Units (PDU). PDUs consist of a header describing the PDUs destination and a body containing the payload data. In the OSI model the PDU has a distinct name at each protocol layer. A Physical Layer PDU is called a stream, at the Data Link Layer the PDU is a frame, at the Network Layer the PDU is a packet and at the Transport Layer the PDU is called a segment or message.

PDUs are encapsulated before being transmitted over the physical Ethernet hardware. Each encapsulation contains information for a particular OSI Layer, the Ethernet stream encapsulates a frame which in turn encapsulates a packet which encapsulates a message and so on. This encapsulation, containing headers and payload, is finally transmitted over the network fabric and routed to the destination.

At the Transport Layer, an associated standard, the Transmission Control Protocol (TCP), in addition to providing a simplified interface to applications by hiding the underlying PDU structure, is responsible for rearranging out-of-order PDUs and retransmitting lost data. TCP has been devised to be a reliable data stream delivery service; as such it is optimised for accurate data delivery rather than performance. TCP can often suffer from relatively long delays while waiting for out-of-order PDUs and data retransmission in extreme cases, reducing overall application performance and making it unsuitable for use where a maximum PDU transmission delay (jitter) needs to be guaranteed, in-file systems or media delivery, for example.

Furthermore, at the lowest layer of the TCP/IP hierarchy, in the network access layer where PDUs are transmitted over the network, a fully compliant IEEE 802.1D standard MAC bridge joining separate networks together requires that order is preserved for source and destination pairs.

PDU duplication is another cause of reduced performance in Ethernet networks. A unicast PDU whose destination route has not been learned by a network bridge will be flooded out to all routes from the bridge and will be buffered on multiple outbound ports at the same time. Network reconfiguration affecting the preferred route from a bridge to the destination can cause a duplicate PDU to be sent from a buffer after a duplicate PDU has already been sent out of the previous preferred route, both arriving at the destination. Again, the higher level TCP protocol will handle this but not without degrading overall performance.

Disordering and duplication should not occur during normal operation. These features of multi-path Ethernet networks are constrained by the Rapid Spanning Tree Protocol (RSTP) as defined by the IEEE 802.1D standard. The RSTP maintains a preferred route between bridges by disabling alternative routes, removing multiple paths and loops, leaving a single path that ensures in-order frame delivery.

A RSPT enforced, single path Ethernet network performs well under light network traffic load, however it starts to fail as the network traffic load increases and the number of network connected devices increase in number and performance. Many PDUs being sent concurrently across the network for different destinations will have to use the same route within the network. For some network patterns this can be particularly unfortunate for the performance of the system as a whole due to the saturation of this single route and the congestion it ultimately suffers from.

With the expansion of Ethernet networks, congestion has become a major issue, increasingly impacting networks and preventing many from ever reaching their designed performance goals. The network becomes clogged with data as an ever-increasing number of users, applications and storage devices exchange information. Congestion causes extreme degradation of data centre servers, resulting in under-utilisation of a company's expensive computing resources, often by as much as 50%. This condition will get much worse as networks get faster, with more connected devices distributed over larger geographical areas. The result will be even more wasted resource, time, money and opportunity.

Endpoint congestion can be caused when many end-stations communicate with a single end-station. This many-to-one style of communication is common in HPC and data center applications running on server clusters, it is also present when applications use network attached storage. In this latter context congestion also introduces another recognised issue, that of jitter in which the message delivery period becomes unpredictable. Congestion is an application performance killer; in a simple network delay and jitter prevent a system reaching peak performance levels. In complex networks, congestion can also necessitate the lengthier retransmission of data because intermediate stations between the endpoints simply discard or drop blocked traffic, reducing performance further. In practice, congestion spreads from the originating hot-spot until it backs up over the entire network resulting in un-associated routes being affected by a point of congestion in another part of the network. This is illustrated in the simple network diagram of FIG. 1

Initially the route from A1-B1 becomes blocked due to the server attached to B1 becoming blocked. Switch B is then blocked by subsequent data to or from ports attached to it, which cannot be delivered until the route to B1 is clear.

Very soon after Switch B congests, other connected switches become blocked as they are unable to progress their traffic through Switch B. Switch A congests and now all workstations cannot use the network effectively, even to share traffic with the storage array devices attached to Switch C. Only when B1 clears can traffic flow again, unblocking Switches B and A. The larger the network and the more intermediate stations present, the greater the likelihood of congestion occurring and the more widespread and lasting the effect.

When a network becomes congested, blocked traffic is simply thrown away by the switches in an attempt to reduce the immediate network load, hoping that the congested point will eventually clear. The TCP/IP layer in the sending device will retransmit the data after a timeout. This is disastrous for system performance, at best it greatly increases latency and significantly reduces throughput. If the congestion does not clear quickly an entire network can completely collapse and become incapable of transmitting any traffic.

Congestion will get much worse as networks continue to become larger, faster and denser, with more connected end stations distributed over larger geographical areas. Removing congestion or at least minimising the effects of congestion allows full, sustained use of data center services enabling companies to operate more efficiently and cost effectively.

With the move to 10 Gb Ethernet, devices will connect to the network at the same speed as the interconnecting fabric. This, in turn, will remove the extra network capacity that up until now has helped reduce congestion in previous network generations.

Many higher-level protocols have been devised to try to remove endpoint congestion. They all rely on trying to control the total output bandwidth of the sources sending data into the network with the intention of bringing the input bandwidth close to but not exceeding the congestion threshold. Intermediate network stations achieve this by data flow classification and upstream notification. The inspection of the data flow and subsequent messaging to rate limit the source all takes time, adding latency and complexity. All attempt to manage congestion rather than attempting to prevent it in the first place.

To date none of the congestion management techniques are particularly successful and all ultimately rely on preventing a network from ever achieving sustained peak levels of operation. Localised endpoint congestion may occur before the steady state conditions these techniques rely on have been established and some traffic patterns are inherently so unstable with rapidly changing conditions that the traffic management algorithms are never given a chance to stabilise.

The problem with all congestion management techniques is that congestion has to be occurring before remedial action can be taken. Management at this point can benefit if the network traffic is of a single type and the data rate is constant and predictable, however the benefit is often reduced in the more complex environment of the data center where services run more diverse applications with dynamically changing data flows. In high performance networks, congestion hotspots appear rapidly and move around the network at an incredible rate. This increases the probability of over-constraining the wrong part of the network, as the point of congestion may have moved by the time notification and subsequent action have been applied.

Once congestion is identified by a management technique, data is restricted or rate-limited at the source, preventing saturation. This limits the overall systems capabilities, preventing a service from running at sustained peak performance for fear of causing congestion.

2. Description of Related Art

In US 2007/0064716 a method of controlling data unit handling is described in which congestion management measures may be selectively disabled. However, this offers no benefits in terms of preventing congestion and may indeed add to congestion problems.

In US 2006/0203730 a method of reducing end station latency in response to network congestion is described. This document proposes that in response to a congestion indicator, the introduction of new frames to a queue is prevented i.e. frames are dropped. However, as mentioned earlier this has the disadvantage that where the dropped frames form part of a large group of frames being communicated across the network, in order to ensure the frames arrive at their end station in the correct order, duplicate copies of the frames must be issued.

The present invention seeks to overcome the problems encountered with conventional networks and in particular seeks to provide a method of minimising the effects of congestion in a multi-path network and of with improving the bandwidth of the network.

SUMMARY OF THE INVENTION

The present invention therefore provides a method of sorting data packets in a multi-path network having a plurality of ports; a plurality of network links; and a plurality of network elements, each network element having at least first and second separately addressable buffers in communication with a network link and the network links interconnecting the network elements and connecting the network elements to the ports, the method comprising: sorting data packets with respect to their egress port or ports such that at a network element a first set of data packets intended for the same egress port are queued in said first buffer and at least one other data packet intended for an egress port other than the egress port of the first set of data packets is queued separately in said second buffer whereby said at least one other data packet is separated from any congestion associated with the first set of data packets.

The at least one other data packet may be dynamically routed or may be subject to status routing by the network elements.

In a preferred embodiment the method includes the steps of: assigning to each data packet a destination address which corresponds to at least part of the address of the egress port or ports of the network required by the data packet; and where said destination address assigned to a new data packet matches the destination address of one or more previous data packets recently transmitted across the network, routing the new data packet on the same network link that transmitted the one or more previous data packets having the same destination address and using the same buffer, irrespective of whether a different network link would be selected were the data packet to be dynamically routed.

Also the method preferably further comprises the step of recording in a destination address register associated with the buffer the destination address of the most recent data packet to be queued in said buffer.

Ideally, an ultimate destination address (UDA) is assigned to each data packet, the UDA including at least the destination address of the data packet and at least part of one or more other criteria used for differentiating the data packets being transmitted and wherein the UDA of the most recent data packet to be queued in the buffer is recorded in a destination address register associated with the buffer. The other criteria may be selected from the group comprising: destination End Station; destination priority; destination application; and/or destination TCP stream.

Ideally, the destination address of a new data packet is compared with at least the destination address stored in the register of each buffer so that when a match is identified the new data packet is assigned to the buffer having a matching destination address stored in its associated register.

Moreover, state may be associated with the first and second buffers, the state being operable to record the order in which data packets are transmitted to the buffers so that when a data packet is to be dynamically routed the method comprises the step of identifying, for each dynamic routing selection of a network link, which buffer is the least recently used.

A timer may be associated with each buffer and the method may further comprise the step of, for each buffer, determining whether the most recent data packet delivered to the buffer was delivered more recently than a timer threshold.

Where a new data packet has a destination address matching the destination address stored in the register associated with a buffer and the most recent data packet delivered to the buffer was delivered more recently than the timer threshold, the method may include the step of allocating the new data packet to the buffer having a matching destination address in its associated register.

Also, where a new data packet has a destination address matching the destination address stored in the register associated with a buffer and the most recent data packet delivered to the buffer was delivered beyond the timer threshold, the method may have include the step of permitting dynamic routing of the new data packet on a network link.

Preferably, where the most recent data packet delivered to a buffer was delivered beyond the timer threshold, the buffer is freely available to be allocated to future data packets irrespective of destination address.

With a preferred embodiment a congestion token is issued when a buffer is full and the period of time that must elapse before dynamic selection of a network link is permitted is increased for a data packet which has a destination address matching the destination address stored in the register of the full buffer. When a congestion token is issued by a full buffer, the timer associated with the full buffer may be reset to zero or the timer threshold may be increased.

Additionally, with the preferred embodiment a rejection token is issued when a buffer is prevented from transmitting a queued data packet on a plurality of successive occasions and the period of time that must elapse before dynamic selection of a network link is permitted is increased for a data packet which has a destination address matching the destination address stored in the register of the rejected buffer. When a rejection token is issued by a rejected buffer, the timer associated with the rejected buffer may be reset to zero or the timer threshold may be increased.

Ideally, the data packets are sorted independently of their source or ingress port.

A further aspect of the present invention provides a method of data delivery in a multi-path network having a plurality of ports; a plurality of network links; and a plurality of network elements, each network element having at least first and second separately addressable buffers in communication with a network link and the network links interconnecting the network elements and connecting the network elements to the ports, the method comprising the sorting of data packets in the network according to a first aspect of the present invention.

In a further aspect the present invention provides a multi-path network for use in a network apparatus such as a bridge, switch, router, hub or the like, the multi-path network comprising a plurality of ports, a plurality of network elements and a plurality of network links interconnecting the network elements and the plurality of ports, each network element having at least first and second separately addressable buffers in communication with a network link, the network elements being operable to sort data packets with respect to their egress port or ports such that at a network element a first set of data packets intended for the same egress port are queued in said first buffer and at least one other data packet intended for an egress port other than the egress port of the first set of data packets is queued separately in said second buffer whereby said at least one other data packet is separated from any congestion associated with the first set of data packets.

Either each network element is operable to dynamically route said at least one other data packet or each network element is operable to perform static routing of data packets.

In a preferred embodiment each data packet is assigned a destination address which corresponds to at least part of the address of the egress port or ports of the network required by the data packet; and each network element further includes an address comparator for determining when a new data packet has a destination address matching the destination address of one or more recently transmitted data packets whereby the network element is operable to route the new data packet on the same network link that transmitted the one or more recently transmitted data packets having the same destination address and using the same buffer, irrespective of whether a different network link would be selected were the data packet to be dynamically routed.

Ideally, each network element includes a plurality of destination address registers each register being associated with one of the plurality of buffers respectively, the registers being operable to store the destination address of the most recent data packet assigned to its associated buffer.

The destination address registers may be operable to store the ultimate destination address (UDA) of the most recent data packets to be queued in the buffers associated with the registers, the UDA including at least the destination address of the data packet and at least part of one or more other criteria used for differentiating the data packets being transmitted. The other criteria may be selected from the group comprising: destination End Station; destination priority; destination application; and/or destination TCP stream.

With the preferred embodiment each network element further includes a timer associated with each buffer for monitoring whether the most recent data packet received by a buffer was received more recently than a timer threshold. This enables each network element to be operable to restrict new data packets allocated to a buffer to only those data packets having a matching destination address, when the previous most recent data packet was received by the buffer more recently than the timer threshold.

Ideally, each network element is operable to allocate the new data packet to the buffer having a matching destination address in its associated register when the new data packet has a destination address matching the destination address stored in the register associated with a buffer and the most recent data packet delivered to the buffer was delivered more recently than the timer threshold.

Moreover, each network element may be operable to dynamically route a new data packet on a network link when the new data packet has a destination address matching the destination address stored in the register associated with a buffer and the elapse of time since the most recent data packet was delivered to the buffer is longer than the timer threshold.

Additionally, each network element may be operable to select a buffer for a new data packet on the basis of the buffer least most recently used when the new data packet is to be dynamically routed on a network link.

With the preferred embodiment each network element is operable to issue a congestion token when a buffer is full and is operable to increase the period of time that must elapse before dynamic selection of a network link is permitted for a data packet which has a destination address matching the destination address stored in the register of the full buffer. Each network element may be operable to cause the timer to reset to zero when a congestion token is issued or may be operable to increase the timer threshold when a congestion token is issued.

Similarly, each network element may be operable to issue a rejection token when a buffer is prevented from transmitting a queued data packet on a plurality of successive occasions and is operable to increase the period of time that must elapse before dynamic selection of a network link is permitted for a data packet which has a destination address matching the destination address stored in the register of the rejected buffer. Each network element may be operable to cause the timer to reset to zero when a rejection token is issued or may be operable to increase the timer threshold when a rejection token is issued.

Ideally, the plurality of buffers comprises a plurality of FIFOs.

In a further aspect the present invention provides an Ethernet bridge or router comprising a multi-path network as described above.

Current and future proposed congestion management protocols are complimentary to the present invention due to the fact that the present invention seeks to remove congestion at a point below any congestion management protocols. Hence, higher level protocol features may remain dormant on either side of a multi-path network which implements the method of the present invention: they are simply not required. Furthermore, the present invention is fully interoperable with current and future congestion management protocols. Should an intermediate network station supporting the present invention be interposed between stations implementing a higher level congestion management protocol, the redundant congestion protocol is simply routed, allowing devices on either side to benefit, if possible.

The foregoing and other objects, aspects and advantages will be better understood from the following detailed description of a preferred embodiment of the present invention with reference to the drawings, in which:

DETAILED DESCRIPTION OF THE PREFERRED EMBODIMENT

The Ethernet bridge or router described below introduces an additional protocol layer, referred to herein as an 'Encapsulation Layer', that appears between the Physical Layer and the Data Link Layer of the standard OSI model which can encapsulate both Network Layer and Data Link Layer PDUs.

In the context of this document the definitions of an intermediate station is extended to include a station capable of forwarding packets encapsulated at the additional protocol layer referred to herein as the Encapsulation Layer. This type of station will be referred to herein as a Bridge Fabric or Network Fabric. A multi-port Bridge Fabric may be implemented by a collection of Bridge Fabric Switches (BFSs) interconnected by Bridge Fabric Switch Links (BFSLs).

Complete encapsulation in a PDU, which is the subject of co-pending United Kingdom patent application number 0807937.8, the whole contents of which is incorporated herein by reference, and which is referred to herein as a 'Fabric Protocol Data Unit' (FPDU), avoids the necessity of modifying the underlying PDU frame headers or trailers, and thus removes the overhead of recalculating the cyclic redundancy check (CRC) or other derived information based upon the contents of the frame. A FPDU is used in implementation of data transmission, acknowledgement and flow-control mechanisms. A FPDU can be further utilised to provide many other attractive features important to large, high performance, scalable Ethernet networks.

Figure 1:
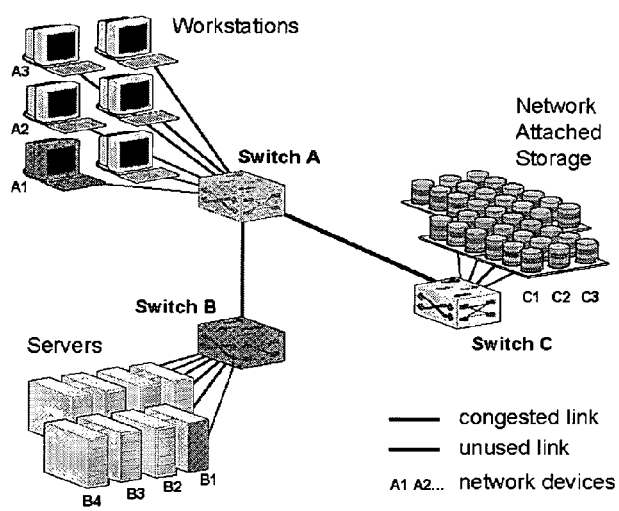
FIG. 1 shows a conventional network and illustrates how congestion can develop in such a network.
Figure 2:
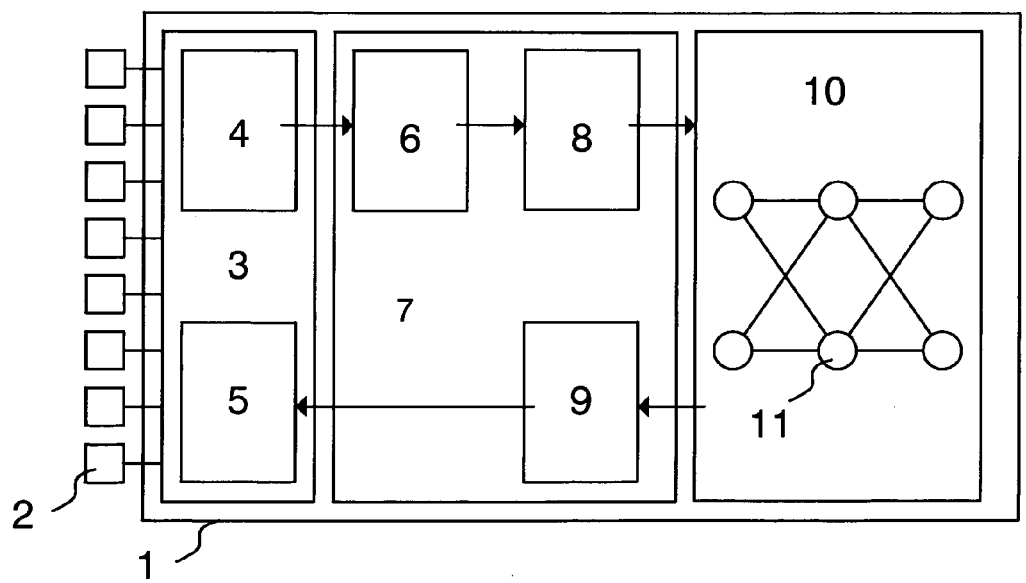
FIG. 2 illustrates schematically an Ethernet bridge that includes a multi-path network which implements end point congestion management in accordance with the present invention.

An Ethernet bridge or router 1 is illustrated in FIG. 2 which may be connected to a plurality of separate Ethernet stations 2 and which implements the encapsulation of both Network Layer and Data Link Layer PDUs in a FPDU. The Ethernet bridge 1 generally comprises a multi-path network 10 in combination with a plurality of Ethernet ports 3 (only one is illustrated for the sake of clarity) with each port being individually connectable to an Ethernet station 2. The Ethernet ports 3 are generally conventional in design and each includes means for establishing a data connection with an Ethernet station, a receiving means or input 4 for performing Ethernet receive functions and a transmitting device or output 5 for performing Ethernet transmit functions.

The Ethernet ports 3 are connected to a network interface 7 that provides conventional functionality such as packet buffering 6. However, the network interface 7 additionally includes an Ethernet PDU encapsulator 8 which connects the network interface 7 to ingress ports (not shown) of the network 10 and an Ethernet PDU decapsulator 9 which connects egress ports (not shown) of the network 10 back to the Ethernet ports 3. The Ethernet PDU encapsulator 8 implements the protocol of the Encapsulation Layer and thus is responsible for the generation of the FPDUs. Ideally, each port 3 of the Ethernet bridge 1 has a respective network interface 7 and thus a respective Ethernet PDU encapsulator 8 and a respective Ethernet PDU decapsulator 9.

Figure 3:
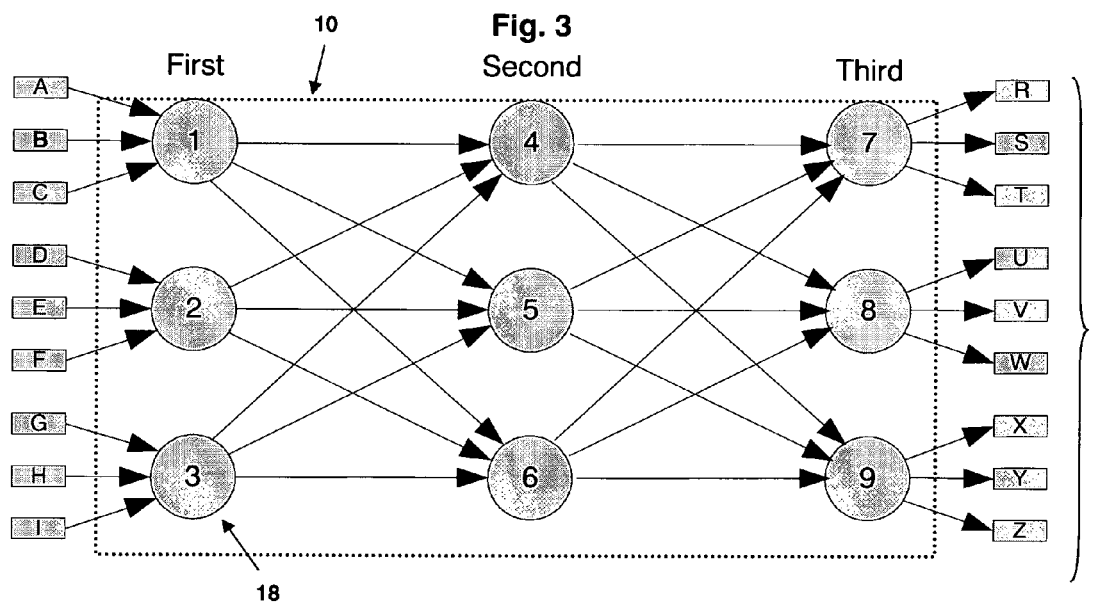
FIG. 3 is a schematic diagram of a multi-path network in accordance with the present invention for use in the Ethernet bridge of FIG. 2 having three stages.
Figure 4:
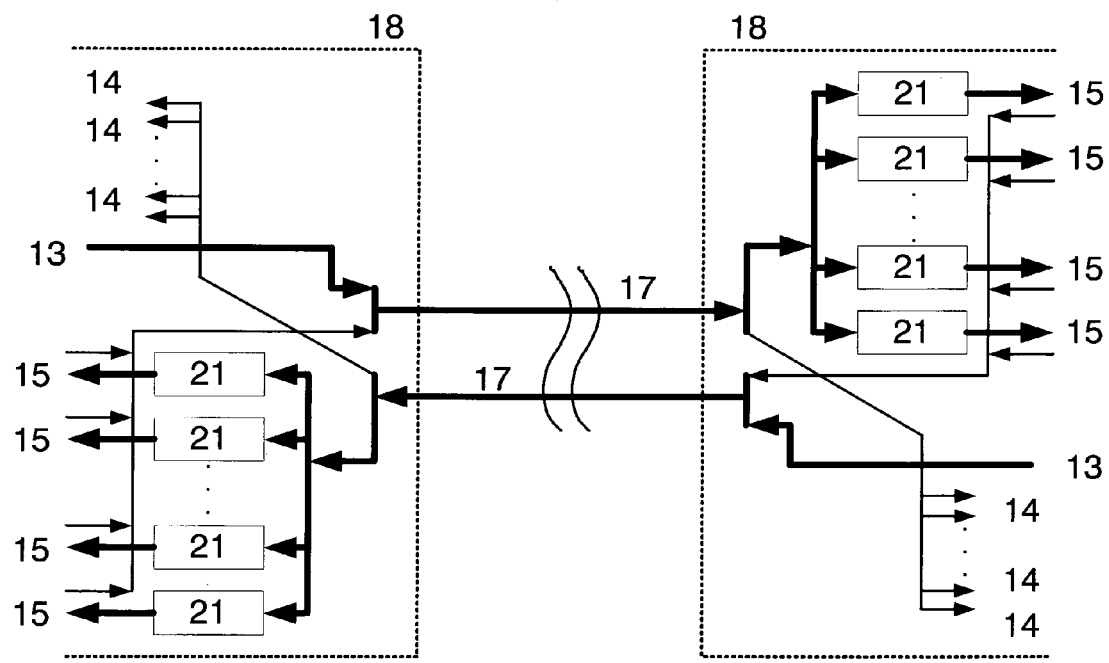
FIG. 4 is a schematic diagram of a link of the multi-path network of FIG. 3, in accordance with the present invention.

The network 10, which is a proprietary multi-path network such as the one shown in FIG. 3, comprises a plurality of interconnected network elements 18 referred to herein as bridge fabric switches (BFSs) interconnected by network links 17 in the form of bridge fabric switch links (BFSLs). Each BFSL 17 is preferably a bi-directional (full duplex) connection. Data is sent in each direction and acknowledgments and flow control state for data in one direction can be multiplexed with the data sent in the opposite direction of the BFSL. FIG. 4 illustrates a BFSL 17 in combination with the input and output connections to the link 17. Of course, in a large network there will be a large number of BFSs and a packet traversing the network 10 will pass through many BFSs 18 and BFSLs 17 before egress from the network. As mentioned earlier, network packets transmitted across the network fabric are referred to herein as Fabric Protocol Data Units (FPDU) and these correspond to encapsulated Ethernet PDUs.

The present invention is based on the realisation that because endpoint congestion occurs when many sources simultaneously attempt to send data to a common destination, network congestion is most pronounced near to the destination endpoint. This can have a serious effect on neighbouring endpoints. Traffic destined for a neighbouring endpoint, which should be free flowing, becomes caught up with the traffic destined for the congested endpoint. Furthermore, there is little that can be done to relieve congestion when it occurs close to the endpoint as the traffic flow has fewer routing options to avoid the blocked path the closer the data gets to the destination. There is usually only one path for the data to follow to reach a destination and if this is blocked then all communications to that destination along that route will congest.

However, when the data is further from the destination endpoint there is much greater choice in which path to follow to a destination in a multi-path network. This flexibility can be used to avoid hotspots in the locality of a congested endpoint, preventing secondary congestion in unrelated routes.

If the switch network is a multi-path network offering more than one possible route from a source to a destination then dynamic routing, such as adaptive routing, can be used. Adaptive connections or adaptive routes are a recognised method for improving the performance of a multi-path switch network especially when the network transports random traffic patterns commonly seen in the complex environment of the data center, for example, where services run more diverse applications with dynamically changing data flows.

The management of packet ordering in a network which employs dynamic routing is not described in detail here as it is the subject of co-pending United Kingdom patent application number 0808862.7, the whole contents of which is incorporated herein by reference. However, it is to be understood that the network 10 described herein, which includes dynamic routing functionality, includes means for maintaining packet ordering for a series of packets having the same source/destination addresses.

An example of a multi-path network 10 that implements dynamic routing is shown in FIG. 3. The network shown is provided solely to illustrate the present invention; it will be immediately apparent that the present invention is equally applicable to many other network topologies involving different numbers of network elements and different degrees and different arrangements of interconnection.

The rectangles A to I and R to Z to the left and right of FIG. 3 represent endpoints, these may be servers, disks or other network segments. The circles represent intermediate network stations 18, typically bridges or routers, depending upon the protocol supported. As mentioned earlier, these intermediate stations are referred to as Bridge Fabric Switches (BFS) which together are capable of implementing larger bridges or routers. The lines extending between the intermediate stations and between the endpoints and the intermediate stations represent the interconnecting links 17, over which data frames or packets will traverse the network 10.

With conventional dynamic routing, a PDU moving from endpoint A to endpoint Z must pass through BFS S1 and S9 but can go via any of BFS S4, S5 or S6. With dynamic routing implemented on BFS 1, if the outputs of BFS S4 and S5 are busy sending data from endpoints B and C, then conventional adaptive routing would normally send the data from endpoint A to BFS S6, this being a less busy connection.

With the present invention, on the other hand, selection of a less busy BFS is not automatic and: other more complex rules are applied, as will be described in greater detail below.

The throughput of any system is determined by the bottlenecks in the system. The bottleneck is the point of lowest bandwidth. For a system suffering from endpoint congestion the bottleneck is the final link to the endpoint and, if uncontrolled, congestion will build up behind a bottleneck, preventing the movement of data destined to other endpoints.

In the context of this document the ultimate destination address (UDA) is intended as reference to a destination address corresponding to at least part of the address of the network egress port. However, the UDA can also include data on other criteria for differentiating data packet such as priority, TCP flow, or other parameters that effect the ultimate destination of the packet. The UDA may comprise a destination address beyond the final network egress port and possibly be even further than the final End Station. This mechanism could be used right up to the Application Layer preventing one application from imposing congestion on another application running on the same End Station.

With the present invention, all FPDUs intended for the same UDA are encouraged to follow each other. This will naturally occur when the data is traversing later stages of network because they are all trying to reach the same UDA across a diminishing number of possible paths. However in the earlier stages of a multi-path network, that uses conventional adaptive routing to avoid congestion, they would be encouraged to take different, less busy routes. Given that these FPDUs will converge again as they attempt to reach the same UDA, the present invention is predicated on the basis that there is no advantage in allowing the dynamic routing to send FPDUs having at least the same UDA in different directions across the network.

Routing of the data packets across the network involves the transmission of the data packets using a series of BFSLs. With the present invention, FPDUs having the same UDA are caused to follow the same path across the network and thus are caused to use the same series of BFSLs. In other words FPDUs are sorted with respect to their egress port(s) and where FPDUs have a common UDA, dynamic routing of the FPDUs is disabled in favour of ensuring all such FPDUs follow the same route. This means that all the FPDUs for a congested endpoint will be delivered in the same amount of time but, importantly, the FPDUs intended for a congested endpoint will not be contending on the connecting links between the BFSs close to the endpoint. The multi-path network will still suffer congestion but now the congestion occurs in the early stages of the passage of the FPDUs across the network where other, unrelated traffic, can more easily dynamically route around the blocking links carrying data to the congested endpoint.

This, in turn, means that when unrelated traffic nears its endpoint it will be far more likely to be using an uncongested link, away from the busy link carrying the FPDUs to the congested endpoint.

As mentioned earlier, and as shown in FIG. 4, the multi-path network consists of a series of intermediate stations or BFSs 18 connected together by links or BFSLs 17. Each of the links 17 is assigned a plurality of individually identifiable Virtual Data Lanes. In this example, each BFSL 17 is assigned eight Virtual Data Lanes but it will be apparent that fewer or more Virtual Data Lanes may be implemented, as necessary, to meet the performance requirements of the network. Each Virtual Data Lane has allocated to it at least one individually addressable buffer 21 and a flow control 22 (see FIGS. 5 and 6). The buffers 21 may be, for example, FIFOs on the receiving end of the link 17 and are used to buffer data that cannot be sent on immediately. The flow control 22 is a mechanism for managing Data Lane assignment for packets at each network link and for ensuring that the buffers do not overflow.

At any moment in time, each Virtual Data Lane should be transmitting data for only one UDA. Whilst it is expected that multiple FPDUs will share a Virtual Data Lane, they should all have the same UDA. That is to say, whilst one or more FPDUs remain held in one of the eight parallel buffers 21 awaiting onward transmission, the only new FPDUs that may be queued in that buffer are those having the same UDA.

To enable Data Lane assignment, each Virtual Data Lane is also allocated a UDA register 23. The register 23 of each Virtual Data Lane is loaded with an FPDU's UDA number each time an FPDU is transmitted on the BFSL using that Virtual Data Lane and this overwrites any existing UDA number stored in the register 23. Ideally the register 23 is alternatively and/or additionally loaded with the priority of the FPDU or any other criteria being used to differentiate the data packets. Hence, when an FPDU is routed to a BFSL, it is directed onto the Virtual Data Lane that has a matching UDA number 23. If none of the UDAs in the registers 23 for each of the Virtual Data Lanes for that BFSL matches the FPDU's UDA, then preferably the FPDU is directed onto the least recently used Virtual Data Lane.

The previous UDAs of the FPDUs most recently assigned to each Virtual Data Lane never become invalid in the registers. The information remains held in the registers 23 until overwritten by a more recent FPDU assigned to that Data Lane. This means that any new FPDU with a UDA that matches any one of the previous UDAs currently stored in the registers 23 of one of the Virtual Data Lanes is directed to the buffer 21 associated with that Virtual Data Lane, irrespective of the length of time since the last FPDU with that UDA was transmitted.

Figure 6:
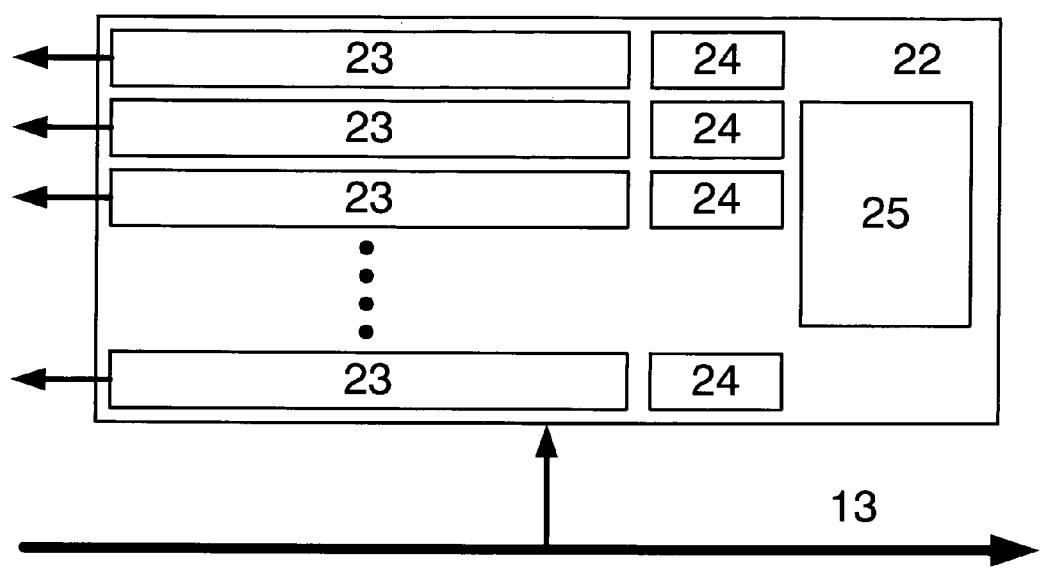
FIG. 6 is a schematic diagram of a flow control for use with the crossbar of FIG. 5.

As mentioned earlier, where a new FPDU is received with a UDA which does not match any of the UDAs stored in the Data Lane registers 23, the FPDU may be freely allocated to any 'available' Virtual Data Lane. The availability of the Data Lane could be determined on the basis of a predetermined period of time having passed since the Data Lane was last allocated to an FPDU but the allocation from the available Virtual Data Lanes is preferably based on identifying the least recently used Data Lane. Hence, as shown in FIG. 6, the data lane control 22 includes 'least recently used' logic 25 which identifies which of the Virtual Data Lanes has been inactive for longest. The least recently used logic 25 is implemented using registers (not shown) that record the order in which the Virtual Data Lanes are assigned. It will, of course, be understood that Data Lane selection methodologies other than 'least recent used' may be adopted, where appropriate.

Each Data Lane register 23 also has a timer 24 that may be in the form of a simple counter which is re-set to zero each time a new UDA is written to the register 23 and which counts up to a predetermined timer threshold. For each Virtual Data Lane, when the timer is between zero and the predetermined threshold, access to the Virtual Data Lane is forced to all FPDUs originating from a crossbar input requesting an adaptive routing selection that includes the output link having a matching UDA on the Virtual Data Lane. In other words, when there is an FPDU which has a UDA that matches a UDA stored in the register 23 of a Virtual Data Lane for which the timer has not reached the threshold, the FPDU is excluded from assignment to any other Virtual Data Lane and is barred from dynamic link selection as the FPDU must be routed using the link that has the Virtual Data Lane with the matching UDA in its register.

Once a timer has reached and/or exceeded the threshold, a match of the UDA on the associated Virtual Data Lane can be ignored by an adaptive routing selection to another network link and the adaptive routing can select any output BFSL. However, if an FPDU is adaptively routed to an output, and the UDA of the FPDU matches the UDA stored in the register 23 of one of the Virtual Data Lanes of that output then, even if the timer has reached the threshold value, the FPDU is forced to use that matching Virtual Data Lane. This is described in more detail below. Ideally, the threshold of the timer 24 is determined to correspond to the average time, assuming a non-congested network, for the buffers to transmit out an incoming FPDU. For example, the threshold of the timer 24 may be set at around 6 microseconds.

If the priority (or some other differentiating criteria) of the FPDU is included in the information stored as part of the UDA in the register 23, the network enables FPDUs having the same destination address but a higher priority to overtake FPDUs with the same destination address but lower priority though the use of an alternate Data Lane i.e. an alternate buffer 21 in the parallel bank of buffers. If, as a 'least recently used' Data Lane, an alternate Data Lane has fewer packets queued in its associated buffer 21, then a higher priority FPDU assigned to the least recently used Data Lane will be transmitted across the network ahead of FPDUs with lower priority that are at the end of a longer queue of packets in a parallel, more recently used, buffer. Higher priority FPDUs are connected across the crossbar switch 19 in preference to lower priority FPDUs. This increases the probability that the FIFO of a Virtual Data Lane with high priority FPDUs will be drained in preference to the FIFO of a Virtual Data Lane with lower priority FPDUs.

Each buffer 21 includes means for monitoring the contents of the FIFO and specifically whether the FIFO is full and/or its output blocked. Where the FIFO is full the buffer issues messages, in the form of congestion tokens 14, on a regular basis back to the BFS with which it is connected via the link 17, indicating that it is full and cannot accept any further packets. Each of these congestion tokens 14, in turn, forces a reset of the associated timer 24 to zero. The congestion tokens 14 also cause the least recently used logic 25 to treat the associated Data Lane as most recently used. In other words, the congestion token causes the Data Lane selection mechanism 25 to update its state so that the Data Lane associated with the buffer issuing the congestion token is least likely for selection. The congestion token is also fed into the switching mechanism of the BFS 18 to prevent connection over the crossbar 19 of the BFS with the congested buffer. In this way, congestion at a buffer connected to the output of the BFS 18, is communicated backwards across the switch to its inputs, through rejections of requests for connection, and thus away from the endpoint.

Similarly, if requests issued by a FIFO to transmit a data packet that the FIFO has queued are rejected sequentially on a plurality of occasions, i.e. the output of the FIFO into a crossbar switch 19 is blocked by other network traffic, the FIFO issues a message in the form of a rejection token 14 to the BFS with which it is connected via the link 17, indicating that its requests have been rejected. The rejection token 14 causes the timer 24 associated with that FIFO to reset to zero and causes the least recently used logic 25 to treat the Virtual Data Lane associated with that FIFO as most recently used. Here too, the rejection token causes the Data Lane selection mechanism 25 to update its state so that the Data Lane associated with the buffer issuing the congestion token is least likely for selection.

However, the rejection tokens are not fed to the crossbar of the BFS 18 and so do not prevent new data packets being transmitted across the BFS to the FIFO. This has the effect of still permitting FPDUs with matching UDA being transmitted to the FIFO (until such time as the FIFO become full) but of reducing to a minimum the risk of the FIFO having queued at one time data packets for different UDAs. Thus, new data packets with different UDAs are highly unlikely to be assigned to that Virtual Data Lane whilst the output of the FIFO remains blocked.

Although the effect of congestion tokens and rejection tokens on the timer 24 is described in terms of the timer being reset to zero, in the alternative receipt of a congestion token or a rejection token may cause the timer threshold to be increased. In either case the effect of a congestion token or a rejection token is to increase the period of time that must elapse before an FPDU having a matching UDA will be granted dynamic network link selection.

In accordance with the congestion management method described herein, certain FPDUs that are transmitted across the network have restrictions applied to the path that the FPDU may take across the network. All data sent on a particular Virtual Data Lane is kept in order and at any one time a link will only be sending FPDU data on one Virtual Data Lane. The method by which FPDUs are restricted to a single Virtual Data Lane is described in greater detail below.

Figure 5:
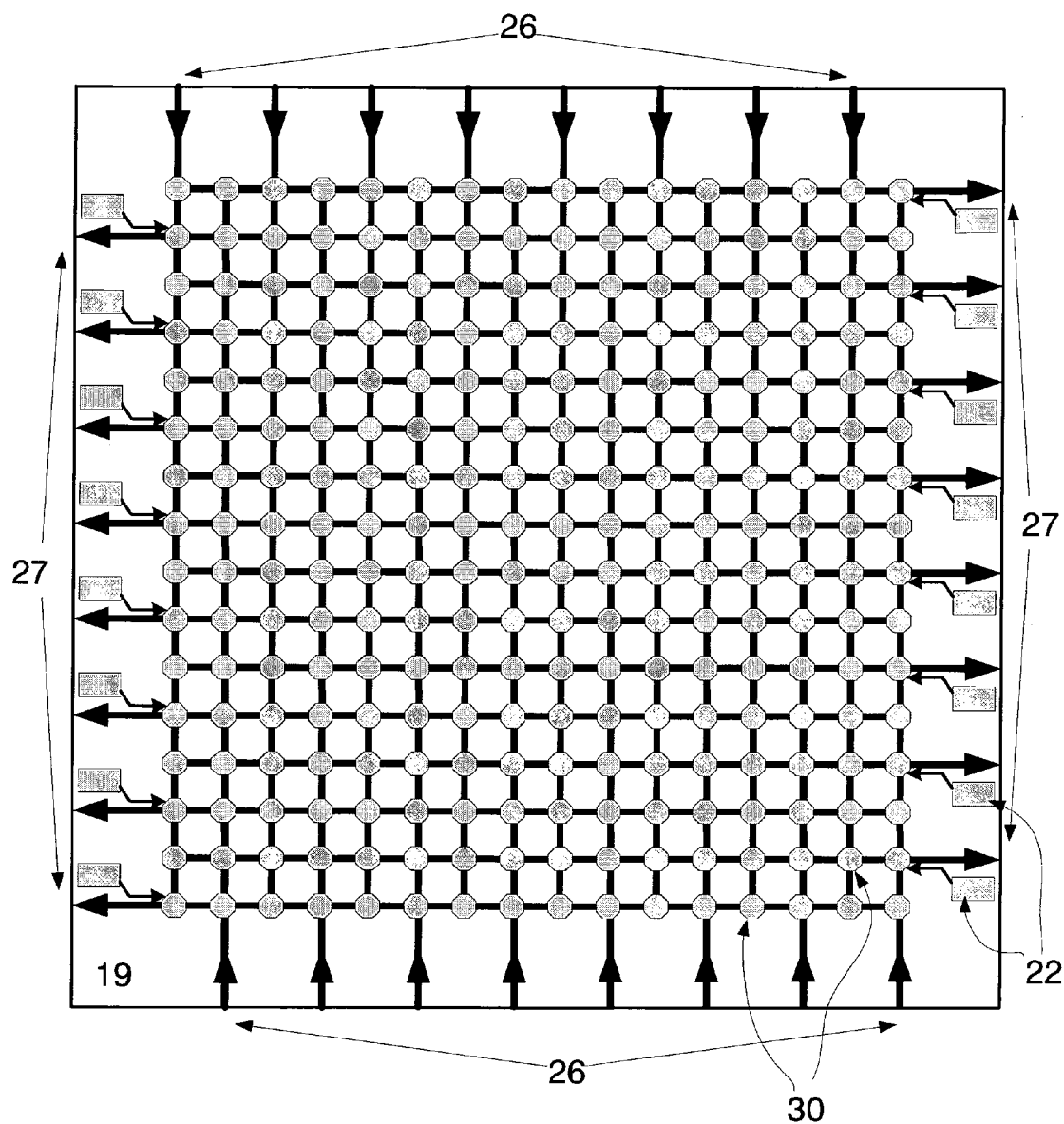
FIG. 5 illustrates schematically a crossbar forming part of a switch of the multi-path network of FIG. 3, in accordance with the present invention.

As mentioned earlier, at the heart of each BFS 18 is a switch crossbar 19. The crossbar 19 has a number of inputs 26 and a number of outputs 27. A simplified example of a crossbar 19 is shown in FIG. 5. It will, of course, be understood that the number of inputs and outputs and their arrangement can be different from the example shown.

When a FPDU is inserted into the network it is assigned a destination number or address which is encoded into the header of the encapsulation of the FPDU and is representative of the end station of the network required for the FPDU to reach its ultimate destination (UDA). This is used at each stage of the network to direct FPDU toward its destination endpoint. The FPDU destination address is decoded as the head of the FPDU is received from a link 17 and activates a request 29 or selection of request lines which is presented at an input to the crossbar 19 of the BFS 18. The request 29 along with the UDA 31 and the FPDU 15 are input into the crossbar 19 of the BFS for selection of a network link and a Virtual Data Lane for onward transmission of the FPDU. The request 29 could be a request for a dynamic route selection for use in early stages of the network or a point-to-point request especially when the FPDU is nearing its end station or a multicast or flood request when, for example, the location of an end station is unknown. One or more of the individual cross-points 30 in the crossbar 19 will respond to the request and connect to the input so that the FPDU data may be transferred across the crossbar 19.

Figure 7:
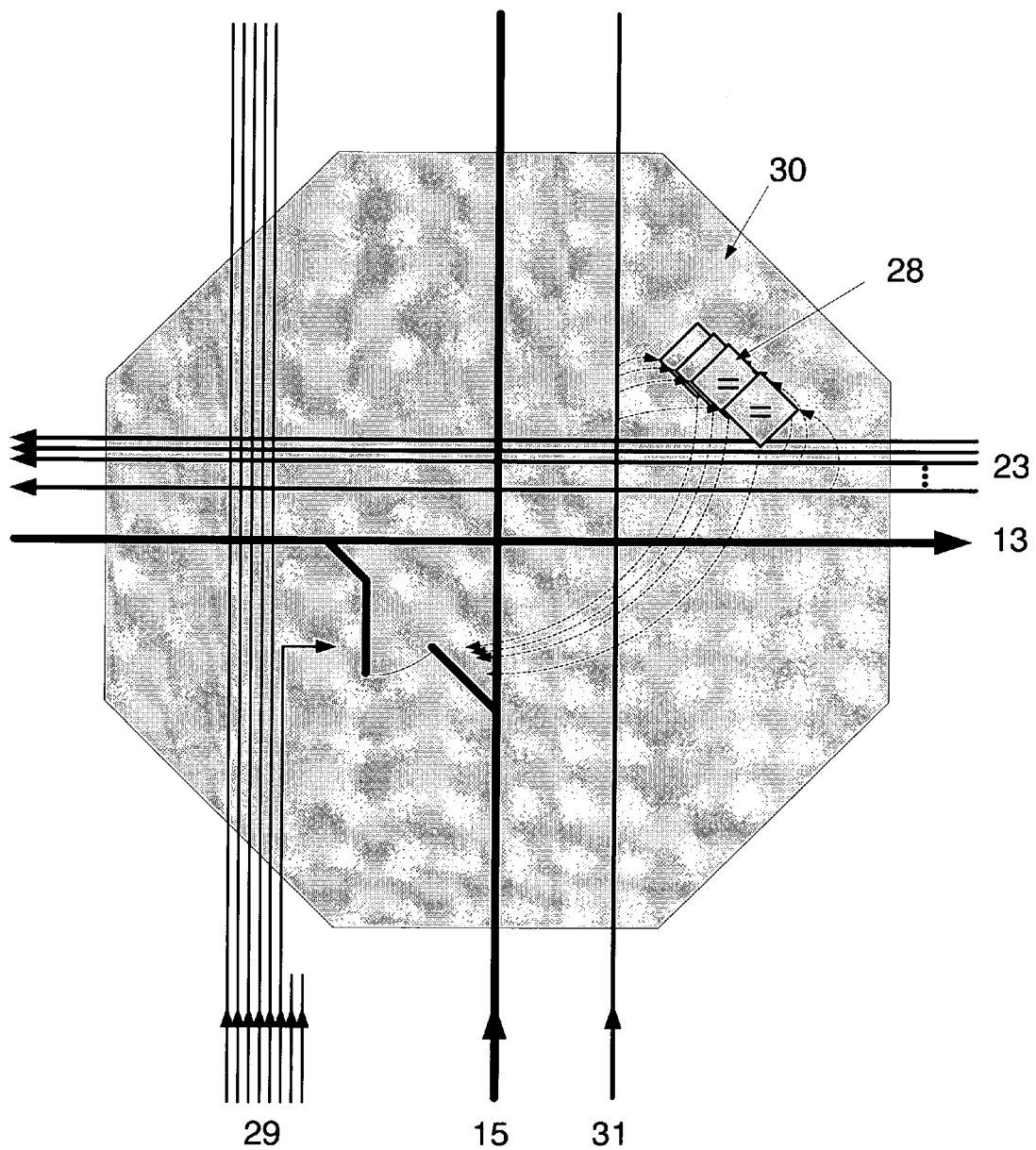
FIG. 7 illustrates, in a simplified form, the operation of a single cross-point switch within the crossbar of FIG. 5.

As illustrated in FIG. 7, the output of a cross-point 30 of the crossbar 19 makes a choice of the Virtual Data Lane to send each FPDU along. As mentioned earlier, each time a FPDU is assigned a Virtual Data Lane the UDA is recorded against the Virtual Data Lane in its associated register 23. These UDA registers, each separately associated with an output 27 of the switch crossbar 19, are tested in the switch cross-point 30 using a set of equivalence checkers or match logic 28 against incoming switch input UDA 31, independently of the availability of otherwise of the Virtual Data Lane. If the incoming switch input request 29 is for a dynamic selection and the UDA 31 of the incoming FPDU, presented at a switch crossbar input 26, matches any of the UDAs stored in association with any of the crossbar outputs 27 that form part of the adaptive set of outputs available for selection and the timer for each Data Lane has not expired, then the FPDU is forced to connect with only that output 27 that has a UDA match. This is true even if the selected output of the crossbar 27 is identified as being 'full' and unable to accept any more data while other outputs are free to accept the FPDU well before the matching output is ready to take the FPDU.

Once the Virtual Data Lane timer 24 has reached its threshold then even if the UDA of the incoming FPDU matches the previous UDA of the Virtual Data Lane the incoming FPDU will be free to dynamically connect to a different switch output and hence a different network link. In this way the timer 24 sets an upper limit to the time duration when packets are forced to follow other packets moving to the same final destination, when the packets are making good progress. Selection of which Virtual Data Lane a new data packet is to be allocated may be based simply on the Virtual Data Lane least recently used but alternative random or quasi-random selections are also envisaged.

When the match logic 28 triggers a switch selection of an output of the crossbar 27, this selection then inhibits any other cross-points 30 in the crossbar from connecting to the same input data 15 unless, of course, the request 29 is a multi-cast request. This switch selection, based on the output of the match logic 28, forces FPDUs to be fed to the same buffer (Virtual Data Lane) as preceding FPDUs having matching UDAs.

However there is no upper limit to forcing packets to follow other packets to the same UDA if the packets are being blocked from making good progress. This will be the case where many network ingress ports are trying to send to the same network egress port or UDA and are suffering from end point congestion. In this case the Virtual Data Lane buffers will be blocked and the timer values will be continually reset preventing the timer values from reaching their threshold value. In this way endpoint congested data is isolated to one of the many Virtual Data Lanes for a BFSL.

Any FPDU that is received whose UDA does not match any of the previously saved UDAs of the Virtual Data Lanes for the crossbar switch outputs is free to choose any of the output BFSLs that form part or the adaptive selection set. e.g. a randomly selected output BFSL and in so doing will be very likely to avoid endpoint congested data completely. The adaptive selection mechanism only chooses an output BFSL, it does not choose a Virtual Data Lane. The correct choice of Virtual Data Lane on a BFSL is made by the match logic 28 after the output BFSL has been selected.

The present invention implements the rule that it is better to force any buffering of FPDUs that has to happen to occur as early as possible before it can damage the progress of other traffic. This method encourages very early buffering possibly even preventing data that is guaranteed to block from even entering the network until there is space for it to be accepted. Overall, though, the total amount of blocked data, sifting in the network, is significantly reduced in comparison with conventional adaptive networks transmitting the same data.

With the method described herein, endpoint congested data only consumes one of the many Virtual Data Lanes defined for each BFSL. Endpoint congested data can therefore remain blocked within the network and still allow other data to be transmitted on a BFSL using one of the other Virtual Data Lanes defined for the BFSL. In this way unrelated data and higher priority data can overtake the congested data. Indeed the presence of endpoint congesting data significantly improves the delivery of other data that does not suffer endpoint congestion by freeing up the total link bandwidth available to send data. This is opposite behaviour to a more conventional network where congesting data blocks the passage of non-congesting data.

With the present invention, the distribution of blocked data is more evenly spread throughout the network and, in particular, is moved away from the BFSs where data packets are forced to use particular routes and moved towards the early stages of the network where dynamic routing can ensure that data packets for different UDAs can completely avoid areas of congestion.

The multi-path network described herein is truly scalable offering from 256 ports or fewer up to 48,000 ports or more. A single Ethernet bridge or router using the method described herein is capable of providing greatly increased connectivity in comparison to conventional Ethernet bridges. For example, currently the largest 10 Gbe Ethernet bridges (which are modular in construction) offer only 288 ports. With the network of the present invention, a single Ethernet bridge is possible which is capable of operating at 10 Gbe or above and is capable of offering, for example, 48,000 ports. Although reference has been made herein to an Ethernet bridge or router it will, of course, be apparent that the present invention may be applied to any multi-path network which transports data packets between inputs and outputs to the network. Also, although the multi-path network has been described with respect to full duplex links, the links may alternatively comprise a half duplex link with a sideband to allow acknowledgments or tokens to be transmitted in the opposing direction.

Although the present invention has been described with respect to a specific multi-path network, it will, of course, be apparent that the present invention is applicable to any multi-path network which implements dynamic routing such as adaptive routing and is not restricted to a network fabric which uses encapsulation of the data packets during its transit across the network.

The present invention also offers significantly improved performance to a multi-path network which uses only static routing. By separating destination data into Virtual Data Lanes and limiting the amount of buffering an individual network egress port can consume within the network, then even with no form of dynamic routing, an individual destination egress port would not be able to prevent other data addressed to egress ports close to the congested egress port from being delivered.

Also, although reference has been made herein to the buffers comprising FIFOs it is to be understood that other forms of buffering may be employed which are capable of storing in an ordered manner a plurality of separate data packets. Also, although reference is made herein to eight separately addressable buffers being connected to each link, it will, of course, be apparent that other numbers of buffers may be adopted, i.e. two or more but more preferably three or more.

It is to be understood, therefore, that various modifications to the preferred embodiment and the generic principles and features described herein will be readily apparent to those skilled in the art. Thus, the present invention is not intended to be limited to the embodiment shown and such modifications and variations also fall within the spirit and scope of the appended claims.

The invention claimed is:

1. A method of sorting data packets in a multi-path network having a plurality of ingress ports and a plurality of egress ports: a plurality of network links; and a plurality of network elements, each network element having at least first and second separately addressable buffers in communication with a network link and located in the network element concerned, and the network links interconnecting the network elements and connecting the ingress ports to the egress ports by way of the network elements, the method comprising, at each network element: sorting incoming data packets with respect to their respective egress port or ports; queuing such sorted incoming data packets, such that a first set of data packets having a first egress port of the multi-path network are queued in said first buffer of the network element concerned, and such that at least one other data packet having an egress port of the multi-path network different from the said first egress port of the multi-path network is queued separately in said second buffer of the network element concerned whereby said at least one other data packet is separated from any congestion associated with the first set of data packets.

2. The method of claim 1, wherein said at least one other data packet is dynamically routed by the network elements.

3. The method of claim 1, wherein said at least one other data packet is subject to static routing by the network elements.

4. The method of claim 2, wherein the method includes the steps of: assigning to each data packet a destination address which corresponds to at least part of the address of the egress port or ports of the network required by the data packet; and where said destination address assigned to a new data packet matches the destination address of one or more previous data packets recently transmitted across the network, routing the new data packet on the same network link that transmitted the one or more previous data packets having the same destination address and using the same buffer, irrespective of whether a different network link would be selected were the data packet to be dynamically routed.

5. The method of claim 4, wherein the method further comprises the step of recording in a destination address register associated with the buffer the destination address of the most recent data packet to be queued in said buffer.

6. The method of claim 4, wherein an ultimate destination address is assigned to each data packet, the ultimate destination address including at least the destination address of the data packet and at least part of one or more other criteria used for differentiating the data packets being transmitted and wherein the ultimate destination address of the most recent data packet to be queued in the buffer is recorded in a destination address register associated with the buffer.

7. The method of claim 6, wherein said other criteria are selected from the group comprising: destination End Station; destination priority; destination application; and/or destination Transmission Control Protocol stream.

8. The method of claim 5, wherein at least the destination address of a new data packet is compared with at least the destination address stored in the register of each buffer so that when a match is identified the new data packet is assigned to the buffer having a matching destination address stored in its associated register.

9. The method of claim 4, wherein state is associated with said at least first and second buffers in communication with each network link, the state being operable to record the order in which data packets are transmitted to the buffers and wherein when a data packet is to be dynamically routed the method comprises the step of identifying, for each dynamic routing selection of a network link, which buffer is the least recently used.

10. The method of claim 4, wherein a timer is associated with each buffer and the method further comprises the step of, for each buffer, determining whether the most recent data packet delivered to the buffer was delivered more recently than a timer threshold.

11. The method of claim 10, further comprising the method step of, where a new data packet has a destination address matching the destination address stored in the register associated with a buffer and the most recent data packet delivered to the buffer was delivered more recently than the timer threshold, allocating the new data packet to the buffer having a matching destination address in its associated register.

12. The method of claim 10, further comprising the method step of, where a new data packet has a destination address matching the destination address stored in the register associated with a buffer and the most recent data packet delivered to the buffer was delivered beyond the timer threshold, permitting dynamic routing of the new data packet on a network link.

13. The method of claim 10, wherein, where the most recent data packet delivered to a buffer was delivered beyond the timer threshold, the buffer is freely available to be allocated to future data packets irrespective of destination address.

14. The method of claim 10, wherein the method further comprises issuing a congestion token when a buffer is full and increasing the period of time that must elapse before dynamic selection of a network link is permitted for a data packet which has a destination address matching the destination address stored in the register of the full buffer.

15. The method of claim 14, wherein when a congestion token is issued by a full buffer, the timer associated with the full buffer is reset to zero.

16. The method of claim 14, wherein when a congestion token is issued by a full buffer, the timer threshold is increased.

17. The method of claim 10, further comprising the method steps of issuing a rejection token when a buffer is prevented from transmitting a queued data packet on a plurality of successive occasions and increasing the period of time that must elapse before dynamic selection of a network link is permitted for a data packet which has a destination address matching the destination address stored in the register of the rejected buffer.

18. The method of claim 17, wherein when a rejection token is issued by a rejected buffer, the timer associated with the rejected buffer is reset to zero.

19. The method of claim 17, wherein when a rejection token is issued by a rejected buffer, the timer threshold is increased.

20. The method of claim 1, wherein the data packets are sorted independently of their source or ingress port.

21. A method of data delivery in a multi-path network having a plurality of ports; a plurality of network links; and a plurality of network elements, each network element having at least first and second separately addressable buffers in communication with a network link and the network links interconnecting the network elements and connecting the network elements to the ports, the method comprising the sorting of data packets in the network according to claim 1.

22. A multi-path network for use in a network apparatus, the multi-path network comprising a plurality of ingress ports, a plurality of egress ports, a plurality of network elements and a plurality of network links interconnecting the network elements and connecting the ingress ports to the egress ports by way of the network elements, each network element having at least first and second separately addressable buffers located therein, each buffer being in communication with a network link, wherein each the network element is operable to sort incoming data packets with respect to their respective egress port or ports of the multi-path network, and to queue such sorted incoming data packets such that a first set of data packets having a first egress port of the multi-path network are queued in said first buffer of the network element concerned and at least one other data packet having an egress port different from the said first egress port of the multi-path network is queued separately in said second buffer of the network element concerned, whereby said at least one other data packet is separated from any congestion associated with the first set of data packets.

23. The multi-path network of claim 22, wherein the network apparatus comprises one or more of a bridge, switch, router or hub.

24. The multi-path network of claim 22, wherein each network element is operable to dynamically route said at least one other data packet.

25. The multi-path network of claim 22, wherein each network element is operable to perform static routing of data packets.

26. The multi-path network of claim 22, wherein each data packet is assigned a destination address which corresponds to at least part of the address of the egress port or ports of the network required by the data packet; and each network element further includes an address comparator for determining when a new data packet has a destination address matching the destination address of one or more recently transmitted data packets whereby the network element is operable to route the new data packet on the same network link that transmitted the one or more recently transmitted data packets having the same destination address and using the same buffer, irrespective of whether a different network link would be selected were the data packet to be dynamically routed.

27. The multi-path network of claim 26, wherein each network element includes a plurality of destination address registers each register being associated with one of the plurality of buffers respectively, the registers being operable to store the destination address of the most recent data packet assigned to its associated buffer.

28. The multi-path network of claim 27, wherein the destination address registers are operable to store the ultimate destination address of the most recent data packets to be queued in the buffers associated with the registers, the ultimate destination address including at least the destination address of the data packet and at least part of one or more other criteria used for differentiating the data packets being transmitted.

29. The multi-path network of claim 28, wherein said other criteria are selected from the group comprising: destination End Station; destination priority; destination application; and/or destination TCP stream.

30. The multi-path network of claim 22, wherein each network element further includes a timer associated with each buffer for monitoring whether the most recent data packet received by a buffer was received more recently than a timer threshold.

31. The multi-path network of claim 30, wherein each network element is operable to restrict new data packets allocated to a buffer to only those data packets having a matching destination address, when the previous most recent data packet was received by the buffer more recently than the timer threshold.

32. The multi-path network of claim 30, wherein each network element is operable to allocate the new data packet to the buffer having a matching destination address in its associated register when the new data packet has a destination address matching the destination address stored in the register associated with a buffer and the most recent data packet delivered to the buffer was delivered more recently than the timer threshold.

33. The multi-path network of claim 30, wherein each network element is operable to dynamically route a new data packet on a network link when the new data packet has a destination address matching the destination address stored in the register associated with a buffer and the elapse of time since the most recent data packet was delivered to the buffer is longer than the timer threshold.

34. The multi-path network of claim 33, wherein each network element is operable to select a buffer for a new data packet on the basis of the buffer least most recently used when the new data packet is to be dynamically routed on a network link.

35. The multi-path network of claim 30, wherein each network element is operable to issue a congestion token when a buffer is full and is operable to increase the period of time that must elapse before dynamic selection of a network link is permitted for a data packet which has a destination address matching the destination address stored in the register of the full buffer.

36. The multi-path network of claim 35, wherein each network element is operable to cause the timer to reset to zero when a congestion token is issued.

37. The multi-path network of claim 35, wherein each network element is operable to increase the timer threshold when a congestion token is issued.

38. The multi-path network of claim 30, wherein each network element is operable to issue a rejection token when a buffer is prevented from transmitting a queued data packet on a plurality of successive occasions and is operable to increase the period of time that must elapse before dynamic selection of a network link is permitted for a data packet which has a destination address matching the destination address stored in the register of the rejected buffer.

39. The multi-path network of claim 38, wherein each network element is operable to cause the timer to reset to zero when a rejection token is issued.

40. The multi-path network of claim 38, wherein each network element is operable to increase the timer threshold when a rejection token is issued.

41. The multi-path network of claim 22, wherein the plurality of buffers comprises a plurality of First In, First Outs (FIFOs).

42. An Ethernet bridge or router comprising the multi-path network of claim 22.

* * * * *